United States Patent
Yamano et al.

(10) Patent No.: US 9,866,721 B2
(45) Date of Patent: Jan. 9, 2018

(54) INFORMATION PROCESSING APPARATUS, IMAGE FORMING APPARATUS, AND NON-TRANSITORY COMPUTER READABLE MEDIUM FOR FILE DISTRIBUTION TO SERVERS

(71) Applicant: FUJI XEROX CO., LTD., Tokyo (JP)

(72) Inventors: Yuko Yamano, Kanagawa (JP); Toshiaki Koue, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/060,997

(22) Filed: Mar. 4, 2016

(65) Prior Publication Data
US 2017/0013160 A1  Jan. 12, 2017

(30) Foreign Application Priority Data
Jul. 8, 2015  (JP) .................................. 2015-137189

(51) Int. Cl.
- H04N 1/21 (2006.01)
- H04L 29/08 (2006.01)
- H04N 1/00 (2006.01)
- H04N 1/34 (2006.01)
- H04N 1/44 (2006.01)
- G06F 21/62 (2013.01)

(52) U.S. Cl.
CPC ....... *H04N 1/2166* (2013.01); *G06F 21/6245* (2013.01); *H04L 67/1097* (2013.01); *H04N 1/00344* (2013.01); *H04N 1/342* (2013.01); *H04N 1/44* (2013.01); *H04N 2201/0094* (2013.01); *H04N 2201/214* (2013.01)

(58) Field of Classification Search
CPC ................ H04N 1/2166; H04N 1/342; H04N 2201/214; H04L 67/1097; G06F 21/6218
USPC ....... 358/1.16, 1.15, 403; 711/158, 159, 154
See application file for complete search history.

(56) References Cited

U.S. PATENT DOCUMENTS

| | | | | |
|---|---|---|---|---|
| 2003/0065898 A1* | 4/2003 | Flamma | ................ | G06F 3/0601 711/165 |
| 2006/0047659 A1* | 3/2006 | Yagiura | ............... | G06F 21/6218 |
| 2007/0047006 A1* | 3/2007 | Sakai | .................... | G06F 3/1207 358/400 |
| 2010/0042655 A1* | 2/2010 | Tse | .................... | G06F 17/30082 707/694 |
| 2014/0365655 A1* | 12/2014 | Takahashi | ............... | H04L 67/10 709/225 |

FOREIGN PATENT DOCUMENTS

JP  2008-146588 A  6/2008

* cited by examiner

*Primary Examiner* — Jamares Q Washington
(74) *Attorney, Agent, or Firm* — Sughrue Mion, PLLC

(57) ABSTRACT

An information processing apparatus includes a memory, an electronic file obtaining unit, an attribute information obtaining unit, and a display. The memory stores server information in which servers are associated with confidentiality information and charge information. The electronic file obtaining unit obtains an electronic file. The attribute information obtaining unit obtains attribute information including confidentiality information about the electronic file. The display displays, in accordance with the server information and the attribute information, a server satisfying a confidentiality level that is adequate to save the electronic file and the charge information about the server.

20 Claims, 5 Drawing Sheets

FIG. 3

| DOCUMENT ID | DOCUMENT NAME | OWNER | CONFIDENTIALITY LEVEL | STORAGE PERIOD | SIZE | SAVE LOCATION | ... |
|---|---|---|---|---|---|---|---|
|  |  |  |  |  |  |  |  |

FIG. 4

| SERVER ID | CONFIDENTIALITY LEVEL (HIGH/MEDIUM/LOW) | CHARGE (¥/GB) | SET UP INFORMATION ||| ... |
|   |   |   | SET UP USER | MAXIMUM SPACE (GB) | USED SPACE (GB) |   |
| A | MEDIUM | ¥0 | user001 | 50 | 28 |   |
|   |   |   | ⋮ |   |   |   |
| ⋮ |   |   |   |   |   |   |

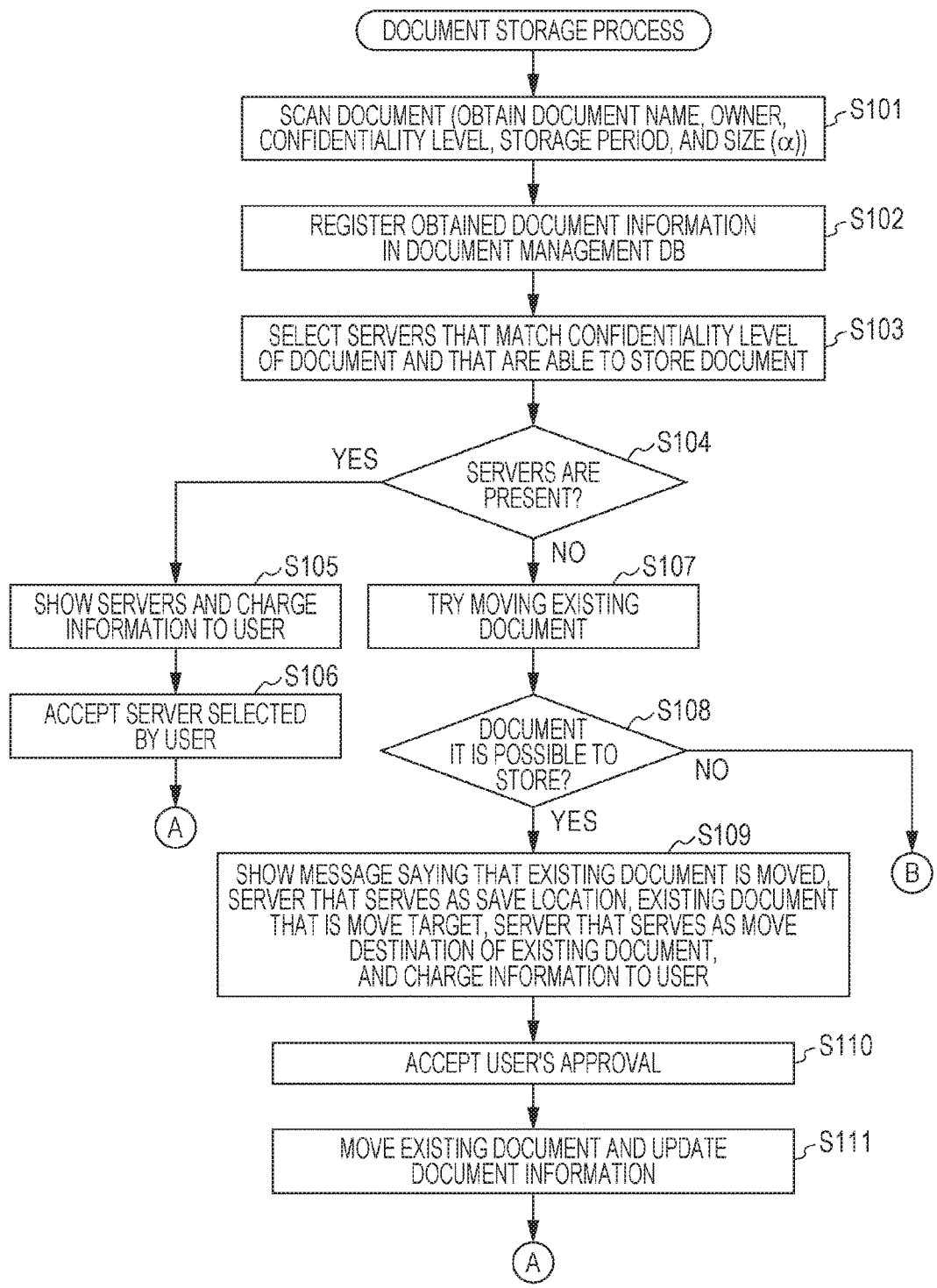

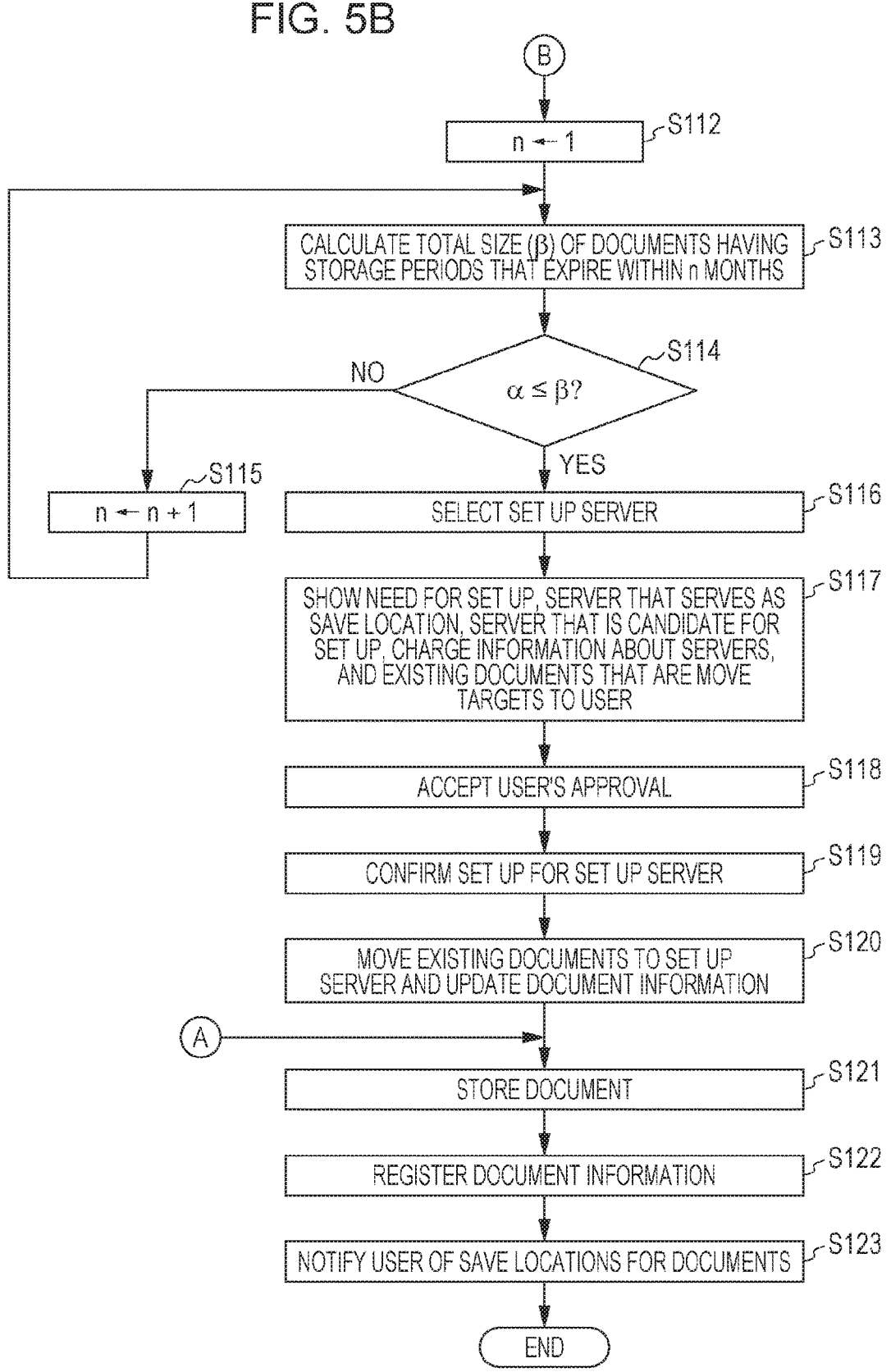

INFORMATION PROCESSING APPARATUS, IMAGE FORMING APPARATUS, AND NON-TRANSITORY COMPUTER READABLE MEDIUM FOR FILE DISTRIBUTION TO SERVERS

CROSS-REFERENCE TO RELATED APPLICATIONS

This application is based on and claims priority under 35 USC 119 from Japanese Patent Application No. 2015-137189 filed Jul. 8, 2015.

BACKGROUND (i) Technical Field

The present invention relates to an information processing apparatus, an image forming apparatus, and a non-transitory computer readable medium.

(ii) Related Art

It is common practice to scan a document by using a multifunction machine or the like and save the result on a server.

Servers that serve as save locations for electronic files may include a server for which a confidentiality level indicating the degree of security of the server is set, or a server that charges a price for saving an electronic file thereon in accordance with the file size, for example.

SUMMARY

According to an aspect of the invention, there is provided an information processing apparatus including a memory, an electronic file obtaining unit, an attribute information obtaining unit, and a display. The memory stores server information in which servers are associated with confidentiality information and charge information. The electronic file obtaining unit obtains an electronic file. The attribute information obtaining unit obtains attribute information including confidentiality information about the electronic file. The display displays, in accordance with the server information and the attribute information, a server satisfying a confidentiality level that is adequate to save the electronic file and the charge information about the server.

BRIEF DESCRIPTION OF THE DRAWINGS

An exemplary embodiment of the present invention will be described in detail based on the following figures, wherein:

FIG. 3 is a diagram illustrating an example of the data structure of document information stored in a document information memory according to the exemplary embodiment;

FIG. 4 is a diagram illustrating an example of the data structure of server information stored in a server information memory according to the exemplary embodiment;

FIG. 5A is a flowchart illustrating a document storage process according to the exemplary embodiment; and FIG. 5B is a flowchart that is continued from FIG. 5A.

DETAILED DESCRIPTION

Hereinafter, an exemplary embodiment of the present invention will be described with reference to the drawings.

Figure 1:
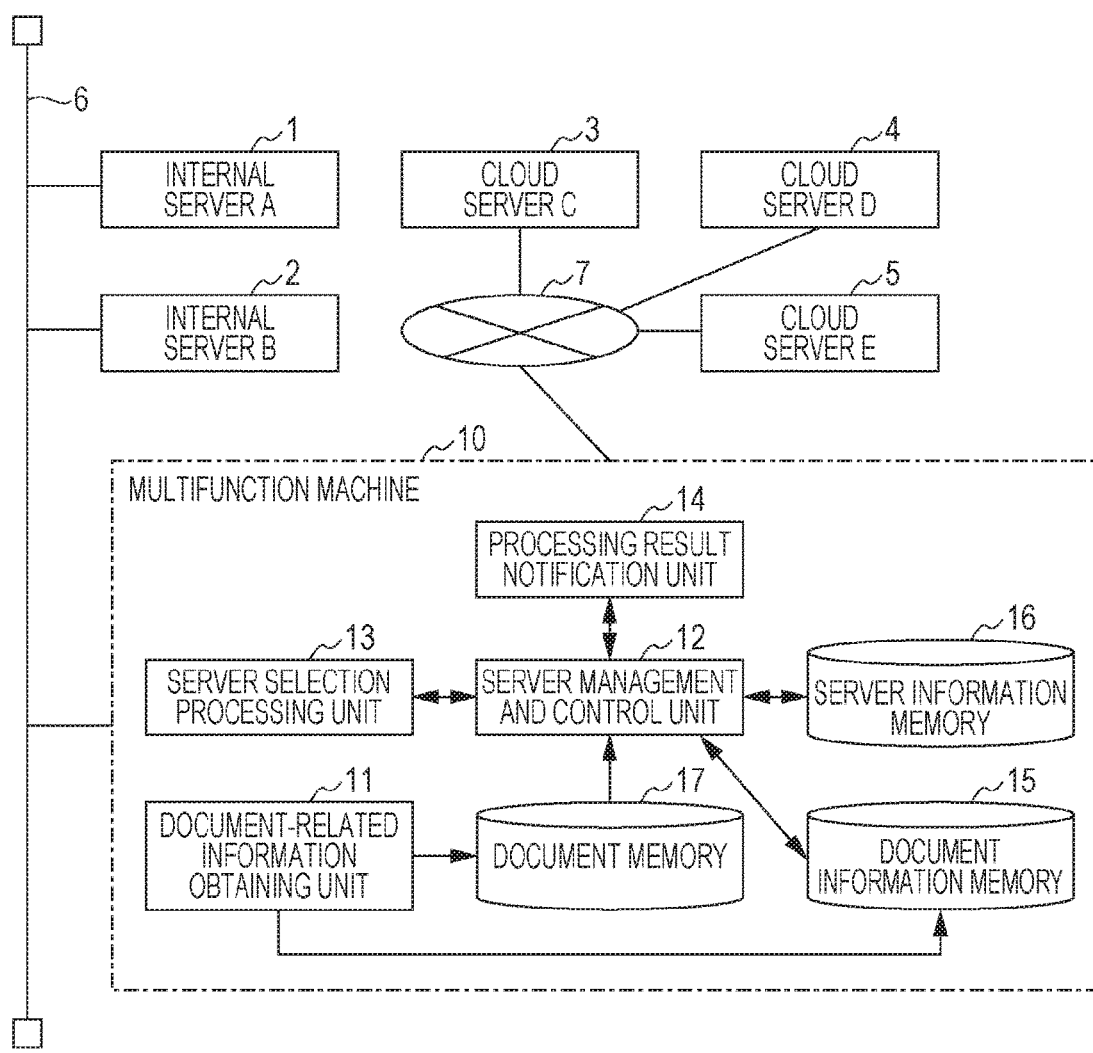
FIG. 1 is a diagram illustrating an overall configuration of a document system including a multifunction machine that is one form of an image forming apparatus according to an exemplary embodiment of the present invention, and a block configuration of the multifunction machine.

FIG. 1 is a diagram illustrating an overall configuration of a document system including a multifunction machine 10 that is one form of an image forming apparatus according to an exemplary embodiment of the present invention, and a block configuration of the multifunction machine 10. FIG. 1 illustrates the multifunction machine 10, internal servers 1 and 2 (internal servers A and B in FIG. 1) that are connected to a local area network (LAN) 6 to which the multifunction machine 10 is connected, and cloud servers 3 to 5 (cloud servers C to E in FIG. 1) that are connected to the Internet 7. Each of the internal servers 1 and 2 and cloud servers 3 to 5 is a server computer that is provided for the purpose of saving electronic files and so on. In this exemplary embodiment, the internal servers 1 and 2 and the cloud servers 3 to 5, which correspond to external servers, need not be specifically distinguished from each other in terms of the purpose of saving electronic files. Accordingly, the internal servers 1 and 2 and the cloud servers 3 to 5 may be generically referred to as "servers" in a description given below. For each server according to this exemplary embodiment, information about the confidentiality level which serves as an indicator indicating the degree of security, and information about the charge which serves as an indicator indicating a cost incurred for saving an electronic file on the server are set.

The multifunction machine 10 is one form of an image forming apparatus and has a copy function, a scan function, a facsimile function, and other various functions. When the multifunction machine 10 according to this exemplary embodiment obtains a document by scanning an original, the multifunction machine 10 stores the electronic document data (hereinafter also simply referred to as "document") on one of the servers by referring to information about the confidentiality level and the charge that are set for each server.

Figure 2:
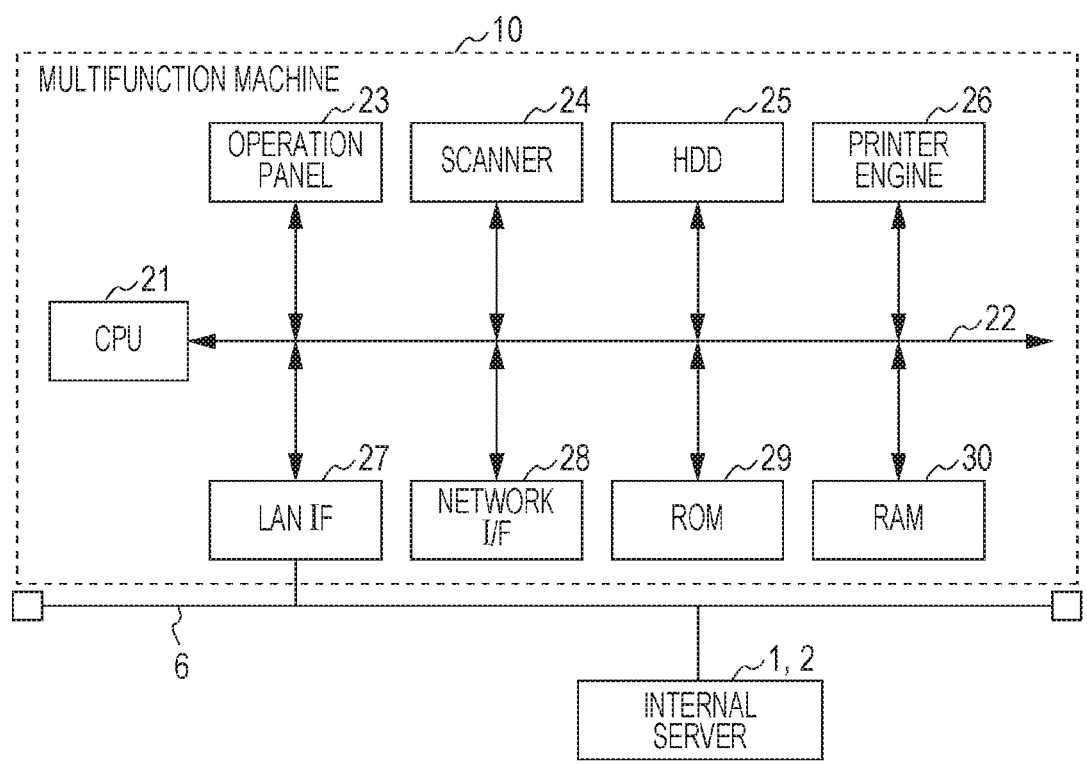
FIG. 2 is a diagram illustrating a hardware configuration of the multifunction machine according to the exemplary embodiment.

FIG. 2 is a diagram illustrating a hardware configuration of the multifunction machine 10 according to this exemplary embodiment. An information processing apparatus (computer) is built in the multifunction machine 10. In FIG. 2, a central processing unit (CPU) 21 performs operation control on various mechanisms mounted on the apparatus, such as a scanner 24 and a printer engine 26, in accordance with a program stored in a read-only memory (ROM) 29. An address data bus 22 is connected to the various mechanisms that are targets of control by the CPU 21 and is used to perform data communication. An operation panel 23 is a user interface that accepts instructions from a user and displays information. The scanner 24 reads an original loaded by the user. A hard disk drive (HDD) 25 stores an electronic file of an electronic document or the like obtained by the scanner 24 performing a read operation. The printer engine 26 prints an image on an output sheet in accordance with an instruction from a control program that is executed by the CPU 21. A LAN interface (I/F) 27 is connected to the LAN 6 and is used to perform data communication with the internal servers 1 and 2. A network I/F 28 is connected to the Internet 7 and is used to perform data communication with the cloud servers 3 to 5. The ROM 29 stores therein various programs for controlling the apparatus or for transmitting and receiving electronic files. When various programs are executed, constituent elements described below provide predetermined processing functions. A random access memory (RAM) 30 is used as a work memory when a program is executed or as a communication buffer.

Referring back to FIG. 1, the multifunction machine 10 includes a document-related information obtaining unit 11, a server management and control unit 12, a server selection processing unit 13, a processing result notification unit 14, a document information memory 15, a server information memory 16, and a document memory 17. Note that constituent elements that are not referred to in the description of this exemplary embodiment are omitted from FIG. 1. Further, in this exemplary embodiment, a case where a document is handled as an electronic file is described, for example. The document-related information obtaining unit 11 functions as an electronic file obtaining unit and an attribute information obtaining unit. The electronic file obtaining unit obtains a document to be newly saved on one of the servers. The attribute information obtaining unit obtains document information. Document information includes identification information about the obtained document and attribute information that includes at least confidentiality information indicating the confidentiality level of the obtained document. The server management and control unit 12 functions as a server information obtaining unit, a saving unit, a processing unit, and an instruction issuing unit. The server information obtaining unit obtains server information that includes at least information about the confidentiality level and the charge that are set for each of the plural servers. In a case where a server, for which a confidentiality level that is adequate to save the document obtained by the document-related information obtaining unit 11 is set, does not have space available for saving the document and if the space for saving the document becomes available on the server when an existing document saved on the server is moved to another server, the saving unit moves the existing document to the other server and thereafter saves the document on the server. In the case where a server, for which a confidentiality level that is adequate to save the document obtained by the document-related information obtaining unit 11 is set, does not have space available for saving the document, the processing unit processes and makes the document smaller so as to be saved on the server. The instruction issuing unit issues an instruction for saving a save-target document to a candidate save location displayed by the server selection processing unit 13.

The server selection processing unit 13 functions as a display that displays a server selected by the server management and control unit 12 as a candidate save location and information about the charge imposed by the server. The processing result notification unit 14 functions as a creation unit and a notification unit. The creation unit creates a list in which a save-target document and an existing document that has been moved to another server in order to save the save-target document are associated with servers that serve as save locations for the respective documents. The notification unit notifies the user that the documents have been saved on servers. The document memory 17 stores therein a document obtained by the document-related information obtaining unit 11.

FIG. 3 is a diagram illustrating an example of the data structure of document information stored in the document information memory 15 according to this exemplary embodiment. In the document information, a document ID that serves as identification information about a document, and attribute information about the document, namely, the document name, owner, confidentiality level, storage period, size, save location, and so on of the document, are set. As the confidentiality level, a level that indicates the confidentiality (degree of confidentiality) of the document is set. In this exemplary embodiment, one of the confidentiality levels, namely, "high", "medium", or "low", is set. As the owner, the user ID of a user who is the owner of the document is set. As the save location, the server ID of a server that saves the document thereon is set. As the storage period, a period over which the document is saved on the server as a confidential document is set.

FIG. 4 is a diagram illustrating an example of the data structure of server information stored in the server information memory 16 according to this exemplary embodiment. In the server information, a server ID that serves as identification information about a server, and attribute information, such as the confidentiality level, the charge, and set up information, are set. As the confidentiality level, a confidentiality level that is set for the server is set. In this exemplary embodiment, one of the confidentiality levels, namely, "high", "medium", or "low", is set, as for a document. As the charge, a cost incurred per 1 GB space within the space (maximum space) that becomes available for saving documents as a result of a set up procedure is set. In a case where a document is saved at no charge, "0 yen" is set. As the set up information, information about a user who uses the server is set. The set up information includes various types of information, such as a set up user, maximum space, and used space. As the set up user, the user ID of a user who has performed a set up procedure for the server is set. As the maximum space, the upper limit of space that is available for saving documents of the user is set. The used space indicates space within the maximum space which is currently used by the user. Note that, in this exemplary embodiment, it is assumed that a set up procedure for a server is performed on a per user basis; however, a set up procedure for a server may be performed not only on a per user basis, but also on a per department basis in a case of a company or the like. In this exemplary embodiment, the server information is updated by the server management and control unit 12 as needed.

The document-related information obtaining unit 11, the server management and control unit 12, and the server selection processing unit 13 included in the multifunction machine 10 are implemented by the computer mounted on the multifunction machine 10 and a program executed by the CPU 21 mounted on the computer working cooperatively. The document information memory 15, the server information memory 16, and the document memory 17 are implemented by using the HDD 25 mounted on the multifunction machine 10 or may be implemented by using the RAM 30 or by using an external memory via a network.

Programs used in this exemplary embodiment may be provided through a communication system as a matter of course or may be stored in a computer-readable recording medium, such as a Universal Serial Bus (USB) memory, and provided therefrom. The programs provided through a communication system or from a recording medium are installed on the computer and executed by the CPU 21 of the computer one by one to thereby perform various processes.

The multifunction machine 10 according to this exemplary embodiment operates so as to store a document obtained by a scan or facsimile reception on a server. Specifically, the multifunction machine 10 determines a storage location (save location) by referring to information about the confidentiality level and the charge that are set for each server. Now, this specific document storage process performed by the multifunction machine 10 is described with reference to the flowcharts illustrated in FIGS. 5A and 5B.

In step S101, a user loads an original on the document glass of the multifunction machine 10 and performs a predetermined operation on the operation panel 23 in order to save the document on a server. When the scanner 24 reads the original in response to this operation, the document-related information obtaining unit 11 of the multifunction machine 10 stores electronic document data (document) of the read original in the document memory 17. At this time, the document-related information obtaining unit 11 newly generates a document ID of the document and obtains the size of the document. The document name, owner, confidentiality level, and storage period of the document are written on the original in a predetermined position, and therefore, the document-related information obtaining unit 11 reads the information in the predetermined position.

Note that, in the above description, it is assumed that document information other than the size is read from the document by using an OCR function or the like; however, the method for obtaining document information is not limited to this. Document information may be obtained by reading code data, such as a QR code (registered trademark), a watermark, or the like. Alternatively, document information input into the operation panel 23 and specified by the user may be received. In a case of plural originals, the originals may be processed one by one, or all of the originals may be processed at once. In a case where all of the originals are processed at once, document information obtained from the first original may be applied to the subsequent originals that are read. In this exemplary embodiment, a save-target document is obtained by a scan; however, a save-target document may be obtained via a network, such as the LAN 6, or may be obtained by reading a save-target document from a storage medium, such as a USB memory, connected to an external media interface (not illustrated).

In step S102, the document-related information obtaining unit 11 registers the document ID and the obtained document information in the document information memory 15 in association with each other. At this time point, the document information about the obtained document except for information about a save location is set.

In step S103, the server management and control unit 12 selects one or more servers that may serve as save locations for the document obtained by the document-related information obtaining unit 11 as described below.

First, the server management and control unit 12 reads the confidentiality level and size of the save-target document from the document information. The server management and control unit 12 refers to the server information and identifies one or more servers for each of which a confidentiality level that is adequate to save the document is set. Here, a server, for which a confidentiality level that is adequate to save the document is set, is a server for which the same confidentiality level as that of the save-target document is set. The server management and control unit 12 checks if the identified servers each have available space that is equal to or larger than the document size. The available space is obtained from the difference between the maximum space and the used space by referring to the server information. The server management and control unit 12 selects one or more servers that have sufficient available space as candidate save locations.

If one or more servers selected as candidate save locations are present, in other words, if one or more servers having available space equal to or larger than the document size are present (Yes in step S104), the server management and control unit 12 retrieves information about the charges imposed by the servers from the server information and instructs the server selection processing unit 13 to display the information.

In step S105, the server selection processing unit 13 displays on the operation panel 23 the one or more servers selected as candidate save locations and the charge information about the servers in response to the instruction given by the server management and control unit 12 to thereby show the information to the user. The servers may be displayed such that the user is able to identify whether each of the shown servers is an internal server or an external server. The servers may be displayed in order of charged price such that servers that charge lower prices are preferentially displayed, that is, such servers are high on the displayed list of the servers, for example. In step S103, only one server may be selected or plural servers may be selected. In a case where only one server is selected, the server is displayed in order to ask confirmation from the user. In a case where plural servers are selected, the server selection processing unit 13 displays a list of the selected servers, and the user refers to the content displayed on the operation panel 23, specifically, the charge information, and selects a server that is to be a save location for the scanned document from the list of the servers. Note that, as the charge information displayed on the operation panel 23, the charge included in the server information may be displayed as is, or a charged price calculated by multiplying the charge included in the server information by the document size may be displayed.

In step S106, when the server selection processing unit 13 accepts a server selected by the user, the server selection processing unit 13 notifies the server management and control unit 12 of the selected server.

In step S121, the server management and control unit 12 retrieves the save-target document stored in the document memory 17 and transmits the document to the server selected by the user to save the document.

In step S122, after the server management and control unit 12 has confirmed that the document has been successfully saved on the server, the server management and control unit 12 sets the server ID of the server as the save location in the document information about the document. Thereafter, the document in the document memory 17 which has been saved on the server may be deleted from the document memory 17.

In step S123, after the save-target document has been successfully saved, the processing result notification unit 14 notifies the user of the save location for the document by displaying on the operation panel 23 the server on which the document has been saved, for example.

The process described above is the basic document storage process in this exemplary embodiment. As described above, the multifunction machine 10 according to this exemplary embodiment stores a save-target document on a server having the same confidentiality level as that of the save-target document and shows charge information to the user before performing a storage operation to ask for confirmation from the user. That is, a save location for a document is determined from the viewpoints of confidentiality and charge.

In step S103, if a server having the same confidentiality level as that of the save-target document and having available space equal to or larger than the document size is not present (No in step S104), the server management and control unit 12 tries moving an existing document as described below (step S107). Specifically, the server management and control unit 12 refers to the server information and selects servers which have the same confidentiality levels as that of the document and for each of which a set up procedure has been performed by the user. Among these servers, one server is selected as a candidate save location for the save-target document, and another server is assumed to be a candidate move destination of an existing document saved on the server that is a candidate save location. The server that is a candidate save location may be selected in accordance with a predetermined selection rule and may be a server that charges the lowest price (free server) or a server that has the largest available space, for example. As an existing document that is a move target, a document having a storage period that has expired, a document having a size larger than that of a save-target document, or a document having a shorter remaining storage period, may be selected, for example. As a matter of course, the size of a document that is selected as a move target is equal to or smaller than the available space of a server that is a candidate move destination. As a result of the trial of moving an existing document saved on the server that is a candidate save location to another server, if it is possible to store the save-target document on the server that is a candidate save location (Yes in step S108), the server selection processing unit 13 displays on the operation panel 23 the server selected as a candidate save location and the charge information about the server in response to an instruction given by the server management and control unit 12 to thereby show the information to the user (step S109), as in step S105. At this time, the server selection processing unit 13 displays on the operation panel 23 a message saying that it is possible to save the save-target document if an existing document is moved to another server, the server that is a candidate save location, the server that is a candidate move destination of the existing document, the charge information about the servers, and the existing document that is a move target. In this process, only one server has been selected as a candidate save location, and therefore, the user does not make a selection but gives their approval while referring to the content displayed on the operation panel 23. If the user gives their approval, the user performs a predetermined operation to input an instruction for approval.

When the server selection processing unit 13 accepts the instruction for approval by the user (step S110), the server management and control unit 12 moves the existing document that is a move target to the move destination server and updates the save location in the document information about the existing document that has been moved with the server ID of the move destination server (step S111). On the server that is a candidate save location, space that is sufficient to store the save-target document becomes available as a result of moving the existing document, and therefore, the server management and control unit 12 transmits the save-target document that is stored in the document memory 17 to the server that is a save location to save the save-target document, as described above (step S121). Subsequently, the server management and control unit 12 sets the server ID of the server that is a save location as the save location in the document information about the save-target document (step S122).

When the above-described process is successfully completed, the processing result notification unit 14 creates a list in which the save-target document, the existing document that has been moved in order to save the save-target document, and the save locations for the respective documents are associated with one another, and displays the list on the operation panel 23, for example, to thereby notify the user of the save locations for the documents (step S123).

As described above, according to this exemplary embodiment, even in a case where plural servers having the same confidentiality levels as that of a save-target document are present, but none of the servers have space available for storing the document, a trial of moving an existing document from a server to another server, the servers having the same confidentiality levels, is carried out to thereby store the save-target document.

If space that is sufficient to store the save-target document does not become available in spite of a move of an existing document (No in step S108), the server management and control unit 12 tries newly performing a set up procedure for a server as described below. Here, a description is given while assuming that the owner of the document has performed a set up procedure only for one server, for simplifying the description. It is further assumed that the set up period for use of a server is set on a per month basis for all servers and that the storage periods of all existing documents have not expired.

First, the server management and control unit 12 sets the initial value of the number of months "n" to the shortest set up period of "1". The server management and control unit 12 refers to the document information and server information, selects existing documents having storage periods that expire within one month from among existing documents of the user which are saved on the server for which the user has performed a set up procedure, and calculates the total size ($\beta$) of the selected existing documents (step S113). If the total size ($\beta$) is smaller than the document size ($\alpha$) of the save-target document (No in step S114), the server management and control unit 12 increments the value "n" by one month and calculates the total size ($\beta$) of existing document having storage periods that expire within two months (step S113). The above process is repeated until the total size ($\beta$) becomes equal to or larger than the document size ($\alpha$) of the save-target document. It is assumed that the total size ($\beta$) consequently becomes equal to or larger than the document size ($\alpha$) because the document size ($\alpha$) is equal to or smaller than the maximum space of the server.

If the total size ($\beta$) is equal to or larger than the document size ($\alpha$) of the save-target document (Yes in step S114), the server management and control unit 12 refers to the server information, and selects a server, which has the same confidentiality level as that of the save-target document and for which the user has not performed a set up procedure, as a server that may be a move destination of the existing documents having storage periods that expire within n months (hereinafter referred to as "set up server") (step S116). A description is given while assuming that at least one server is selected as a set up server. In a case where plural servers are selected as set up servers, a list of the candidate set up servers may be displayed in step S117 described below to make the user select a server.

Subsequently, the server selection processing unit 13 displays on the operation panel 23 the server selected as a candidate save location and the charge information about the server in response to an instruction given by the server management and control unit 12 to thereby show the information to the user, as in step S105. At this time, the server selection processing unit 13 displays on the operation panel 23 a message saying that the user needs to newly perform a set up procedure for a server due to insufficient space, the set up server and the charge information about the set up server, and the existing documents that are move targets. Here, only one server has been selected as a candidate save location, and therefore, the user does not make a selection but gives their approval while referring to information about the server that is a save location, the set up server, and a move of the existing documents. If the user gives their approval, the user performs a predetermined operation to input an instruction for approval. As described above, in the case where plural set up servers are present, the user selects one set up server from the list of the candidate set up servers. When a set up server is identified, the server selection processing unit 13 may display on the operation panel 23 a request message saying that the user needs to perform a set up procedure for the set up server, for example, to prompt the user to perform the set up procedure.

When the server selection processing unit 13 accepts the instruction for approval by the user (step S118), the server management and control unit 12 waits for the user to perform a set up procedure for the set up server. When the server management and control unit 12 confirms that the user has performed a set up procedure for the set up server (step S119), the server management and control unit 12 moves the move-target documents to the set up server and updates the save location in the document information about the moved existing documents with the server ID of the set up server (step S120). On the server that is a candidate save location, space that is sufficient to store the save-target document becomes available as a result of moving the existing documents, and therefore, the server management and control unit 12 transmits the save-target document that is stored in the document memory 17 to the server that is a save location to save the document, as described above (step S121). Subsequently, the server management and control unit 12 sets the server ID of the server that is a save location as the save location in the document information about the save-target document (step S122).

When the above-described process is successfully completed, the processing result notification unit 14 creates a list in which the save-target document, the existing documents that have been moved in order to save the save-target document, and the save locations for the respective documents are associated with one another, and displays the list on the operation panel 23, for example, to thereby notify the user of the save locations for the documents (step S123). The processing result notification unit 14 may display a message saying that the set up procedure has been newly performed for the server and may display the list in such a manner that the set up server is identifiable in the list, on the operation panel 23.

As described above, according to this exemplary embodiment, the user is made to perform a set up procedure for a server to save existing documents having shorter storage periods, and a save-target document is saved on a server on which space consequently becomes available.

In the description given above, it is assumed that a set up procedure is performed by the owner of the document only for one server; however, in a case where the user has performed a set up procedure for plural servers, the server management and control unit 12 may select, for each server, existing documents that are saved on the server and that have storage periods which expire within n months and may calculate the total size (β) of the selected existing documents in step S113. If the total size (β) is equal to or larger than the document size (α) of the save-target document (Yes in step S114), the server management and control unit 12 may try moving the existing documents, as in step S107 described above, and may secure the server that serves as a candidate save location for the save-target document.

In this exemplary embodiment, the user is made to perform a set up procedure for a server regardless of whether the server is a paid server or a free server; however, the server management and control unit 12 may automatically perform a set up procedure for a server in a case where the server is a free server. In a case where the server is a paid server, the user may perform a set up procedure, as described above, or the server management and control unit 12 may automatically perform a set up procedure while notifying the user that the set up server is a paid server.

In this exemplary embodiment, a save-target document is not saved on a server for which a set up procedure has been newly performed, and documents having shorter storage periods are moved to the set up server. The documents having storage periods that expire within n months are saved on the set up server, and therefore, the user may cancel the contract for the set up server at the time point when the set up period reaches n months. If the user saves a save-target document on a set up server, the user usually continues using the set up server until the storage period of the save-target document expires. That is, the user is continuously charged for the use of the set up server. An existing document, which usually has a shorter remaining storage period, is assumed to have a storage period shorter than that of a document which is newly saved, and therefore, it is beneficial to the user to move the existing document having a shorter remaining storage period in terms of a cost incurred for the use of the set up server, although whether or not it is beneficial to move the existing document depends on the length of the storage period that is set for the save-target document as a matter of course.

As described above, in this exemplary embodiment, it is possible to save a save-target document on a server having the same confidentiality level as that of the document with certainty. Further, by showing the charge information about a server having the same confidentiality level to the user to ask for confirmation from the user, it is possible to save a document on an optimum server from the viewpoints of confidentiality and charge.

Note that, in this exemplary embodiment, in order to select existing documents to be moved to a set up server, existing documents having storage periods that expire within one month, two months, and so on are selected on a per month basis in accordance with the unit of the contract period for the server, which is one month, and the total size (β) of the selected existing documents is calculated in step S113. That is, in order to select one or more existing documents having shorter remaining storage periods first, existing documents are selected at once in accordance with the unit of the contract period. However, existing documents may be selected as move targets one by one in order from an existing document having a storage period that expires first, and the total size of the selected existing documents may be calculated. In the case where existing documents having storage periods that expire within n months are processed at once, if a large number of existing documents have storage periods that expire within n months, the total size (β) may become large, the maximum space requested upon a set up procedure may become large, and the charged price may consequently become high. On the other hand, in the case where processing is performed so as to add existing documents one by one until the total size (β) becomes equal to or larger than the document size (α), although the contract period for the set up server is also n months in this case, the total size (β) does not become larger than needed, and it is possible to reduce the charged price.

In this exemplary embodiment, in a case of selecting a server on which a save-target document is to be saved, a server having the same confidentiality level as that of the document is selected as a candidate save location. However, a server having a confidentiality level that is equal to or higher than that of the document may be selected as a candidate save location, although a higher cost may be incurred from the viewpoint of charge. That is, a "server for which a confidentiality level that is adequate to save a document is set", which is defined in the above description as a server having the same confidentiality level as that of the document, may be interpreted to include a server having a confidentiality level equal to or higher than that of the document. For example, as a candidate save location for saving a document having the "medium" confidentiality level, a server having the "medium" or "high" confidentiality level may be selected as a candidate save location instead of a server having the "medium" confidentiality level. A server having a confidentiality level equal to or higher than that of the document may be selected in any case, or a server having a confidentiality level equal to or higher than that of the document may be selected only in a case where a server having the same confidentiality level as that of the document is not present so as to broaden candidate choices.

In the case of selecting a server on which a save-target document is to be saved, the number of confidentiality levels that may be set for documents are the same as that for servers for convenience of a comparison between the confidentiality level of a document and that of a server (three levels in this exemplary embodiment); however, the number of levels that may be set for documents need not be the same as that for servers as long as it is possible to make a comparison of the confidentiality levels. In this exemplary embodiment, the example of moving an existing document in order to secure space available for saving a save-target document is described; however, a function of deleting an existing document may be provided to allow the user to delete an existing unnecessary document.

In step S103, in a case where the server management and control unit 12 fails to select a server having sufficient available space from among servers having the same confidentiality level as that of a save-target document, if it is possible to save the save-target document on a server by processing and making the save-target document smaller, the server management and control unit 12 may make the document smaller. To make the document smaller means to reduce the size of the document. Specifically, the type of document is converted into DocuWorks (registered trademark) or the document is compressed, for example. In a case where a document has been made smaller, the user may be notified that the document has been made smaller and may be asked whether the document made smaller may be saved or not. In the case where a document has been made smaller, the document having a reduced size is saved on a server, and therefore, the document information about the document may include information indicating that the document has been made smaller and that the document has been converted from which type to which type, and a conversion process for restoring the document to the original type may be performed when the user retrieves the document from the server.

In a case where plural servers, for each of which a confidentiality level that is adequate to save a save-target document is set, are present, but none of the servers have space available for saving the save-target document, if it becomes possible to save the save-target document by dividing the document into pieces, the server management and control unit 12 may select servers that are to serve as save locations for the divided document and may save the pieces on the respective servers.

In this exemplary embodiment, the image forming apparatus (multifunction machine 10) on which the information processing apparatus is mounted is described, for example; however, the image forming apparatus need not be used for implementation. The document storage process described above may be performed by using an information processing apparatus that does not have various functions, such as a scan function and a copy function.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory that stores server information in which servers are associated with confidentiality information and charge information; and
at least one hardware processor configured to implement:
an electronic file obtaining unit that obtains an electronic file;
an attribute information obtaining unit that obtains attribute information including confidentiality information about the electronic file;
controlling a display to display, in accordance with the server information and the attribute information, a server satisfying a confidentiality level that is adequate to save the electronic file and the charge information about the server; and
a saving unit that determines a size of the electronic file and whether a storage space corresponding to the size would be made available on the server by removing an existing file from the server.

2. The information processing apparatus according to claim 1, wherein the saving unit that, in a case where the server, for which the confidentiality level that is adequate to save the electronic file obtained by the electronic file obtaining unit is set, does not have space available for saving the electronic file, if the space for saving the electronic file becomes available on the server by moving an existing electronic file saved on the server to another server, saves the electronic file on the server after moving the existing electronic file to the other server.

3. The information processing apparatus according to claim 2, wherein
the attribute information includes a storage period over which the electronic file is stored as a confidential document, and
in a case where the server, for which the confidentiality level that is adequate to save the electronic file obtained by the electronic file obtaining unit is set, does not have space available for saving the electronic file, the saving unit moves an existing electronic file saved on the server and having a storage period that has expired to another server for which a user has performed a set up procedure, or newly performs a set up procedure for a server and moves the existing electronic file having a storage period that has expired to the server for which the set up procedure has been newly performed.

4. The information processing apparatus according to claim 3, wherein
in a case where the server for which a set up procedure is to be newly performed is a free server, the set up procedure is automatically performed.

5. The information processing apparatus according to claim 3, wherein
in a case where the server for which a set up procedure is to be newly performed is a paid server, the user is notified that the server is a paid server before the set up procedure.

6. The information processing apparatus according to claim 1, wherein the at least one hardware processor is further configured to implement:
a processing unit that, in a case where the server, for which the confidentiality level that is adequate to save the electronic file obtained by the electronic file obtaining unit is set, does not have space available for saving the electronic file, processes and makes the electronic file smaller so as to be saved on the server.

7. The information processing apparatus according to claim 6, wherein
in a case where a plurality of servers, for each of which the confidentiality level that is adequate to save the electronic file obtained by the electronic file obtaining unit is set, are present, but none of the servers have space available for saving the electronic file, the processing unit performs a process of dividing the electronic file so as to be saved on the servers.

8. The information processing apparatus according to claim 1, wherein the at least one hardware processor is further configured to implement:
an instruction issuing unit that issues an instruction for saving the electronic file on the server, which is a candidate save location, displayed by the display.

9. The information processing apparatus according to claim 2, wherein the at least one hardware processor is further configured to implement:
a creation unit that creates a list in which the electronic file obtained by the electronic file obtaining unit and the existing electronic file that has been moved in order to save the electronic file are associated with the servers that serve as save locations for the respective electronic files.

10. The information processing apparatus according to claim 2, wherein the at least one hardware processor is further configured to implement:
a notification unit that sends to a user a notification indicating that the electronic file obtained by the electronic file obtaining unit and the existing electronic file that has been moved in order to save the electronic file have been saved on servers.

11. The information processing apparatus according to claim 10, wherein the at least one hardware processor is further configured to implement:
a creation unit that creates a list in which the electronic file obtained by the electronic file obtaining unit and the existing electronic file that has been moved in order to save the electronic file are associated with the servers that serve as save locations for the respective electronic files, wherein
the notification unit sends to the user the notification together with the list.

12. The information processing apparatus according to claim 1, wherein
the display displays the server, which is a candidate save location, so as to indicate whether the server is an internal server or an external server.

13. The information processing apparatus according to claim 1, wherein
in a case where a plurality of servers that are candidate save locations and that have identical confidentiality levels are present, the display preferentially displays a server that charges a lower price.

14. The information processing apparatus according to claim 1, wherein
the electronic file is created by using information about an original read by a reader.

15. An image forming apparatus comprising the information processing apparatus according to claim 1.

16. A non-transitory computer readable medium storing a program causing a computer to execute a process for information processing, the computer being accessible to a memory that stores server information in which servers are associated with confidentiality information and charge information, the process comprising:
obtaining an electronic file;
obtaining attribute information including confidentiality information about the electronic file;
displaying, in accordance with the server information and the attribute information, a server satisfying a confidentiality level that is adequate to save the electronic file and the charge information about the server; and
determining a size of the electronic file and whether a storage space corresponding to the size would be made available on the server by removing an existing file from the server.

17. The information processing apparatus according to claim 1, wherein the at least one hardware processor is further configured to implement:
setting up a new server in a case in which it is determined that the storage space is not available on the server.

18. The information processing apparatus according to claim 17, wherein setting up the new server comprises:
determining a time until one or more files existing on the server are predetermined to be removed from the server;
setting the new server to store the electronic file until the time; and
setting the new server to transfer the electronic file to the server at the time.

19. An information processing apparatus comprising:
a memory that stores server information in which servers are associated with confidentiality information and charge information; and
at least one hardware processor configured to implement:
an electronic file obtaining unit that obtains an electronic file;
an attribute information obtaining unit that obtains attribute information including confidentiality information about the electronic file;
controlling a display to display, in accordance with the server information and the attribute information, a server satisfying a confidentiality level that is adequate to save the electronic file and the charge information about the server; and
a saving unit that, in a case where the server, for which the confidentiality level that is adequate to save the electronic file obtained by the electronic file obtaining unit is set, does not have space available for saving the electronic file, if the space for saving the electronic file becomes available on the server by moving an existing electronic file saved on the server to another server, saves the electronic file on the server after moving the existing electronic file to the other server, wherein the attribute information includes a storage period over which the electronic file is stored as a confidential document, and wherein in a case where the server, for which the confidentiality level that is adequate to save the electronic file obtained by the electronic file obtaining unit is set, does not have space available for saving the electronic file, the saving unit moves an existing electronic file saved on the server and having a storage period that has expired to another server for which a user has performed a set up procedure, or newly performs a set up procedure for a server and moves the existing electronic file having a storage period that has expired to the server for which the set up procedure has been newly performed.

20. An information processing apparatus comprising:

a memory that stores server information in which servers are associated with confidentiality information and charge information; and at least one hardware processor configured to implement:
  an electronic file obtaining unit that obtains an electronic file;
  an attribute information obtaining unit that obtains attribute information including confidentiality information about the electronic file;
  controlling a display to display, in accordance with the server information and the attribute information, a server satisfying a confidentiality level that is adequate to save the electronic file and the charge information about the server;
  a processing unit that, in a case where the server, for which the confidentiality level that is adequate to save the electronic file obtained by the electronic file obtaining unit is set, does not have space available for saving the electronic file, processes and makes the electronic file smaller so as to be saved on the server, wherein in a case where a plurality of servers, for each of which the confidentiality level that is adequate to save the electronic file obtained by the electronic file obtaining unit is set, are present, but none of the servers have space available for saving the electronic file, the processing unit performs a process of dividing the electronic file so as to be saved on the servers.

\* \* \* \* \*